(12) United States Patent
Roggemans et al.

(10) Patent No.: US 9,162,771 B2
(45) Date of Patent: Oct. 20, 2015

(54) HYBRID POWER SUPPLY ARCHITECTURE FOR SUPPLYING MECHANICAL POWER TO A ROTOR AND MANAGED FROM THE ON-BOARD NETWORK OF A ROTORCRAFT

(71) Applicant: EUROCOPTER, Marignane, Cedex (FR)

(72) Inventors: Emmanuelle Roggemans, Cabries (FR); Jean-Francois Logeais, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 205 days.

(21) Appl. No.: 13/938,636

(22) Filed: Jul. 10, 2013

(65) Prior Publication Data
US 2014/0013751 A1 Jan. 16, 2014

(30) Foreign Application Priority Data
Jul. 12, 2012 (FR) ...................................... 12 01974

(51) Int. Cl.
*B64D 41/00* (2006.01)
*B64D 31/14* (2006.01)
*B64C 27/12* (2006.01)
*B64D 27/24* (2006.01)
*B64D 27/02* (2006.01)

(52) U.S. Cl.
CPC ................ *B64D 31/14* (2013.01); *B64C 27/12* (2013.01); *B64D 27/24* (2013.01); *B64D 2027/026* (2013.01); *B64D 2221/00* (2013.01); *Y02T 50/64* (2013.01)

(58) Field of Classification Search
None
See application file for complete search history.

(56) References Cited

U.S. PATENT DOCUMENTS

| 4,380,725 A | 4/1983 | Sherman |
| 4,551,632 A | 11/1985 | Jourdan et al. |
| 5,203,520 A | 4/1993 | Pryzgodzki et al. |

(Continued)

FOREIGN PATENT DOCUMENTS

| DE | 102007017332 A1 | 10/2008 |
| DE | 102008014404 A1 | 10/2009 |

(Continued)

OTHER PUBLICATIONS

Search Report and Written Opinion; Application No. FR 1201974; dated Mar. 12, 2013.

*Primary Examiner* — Christopher P Ellis
*Assistant Examiner* — Richard G Davis
(74) *Attorney, Agent, or Firm* — Brooks Kushman P.C.

(57) ABSTRACT

An architecture for a hybrid power plant for driving a rotorcraft rotor (1). The rotorcraft is fitted with an electrical energy distribution network (17) for distributing electrical energy from a management network (20) that is interposed between the distribution network (17) and electrical energy sources (4, 9, 10). A management computer (21) takes account of information about the working of a combustion engine (3) for driving the rotor (1), about the working of the electrical energy sources (4, 9, 10) fitted to the rotorcraft and including an energy store (9), a reversible electric machine (4), and an electricity generator (10) engaged with the combustion engine, and about the electrical energy needs of the electricity distribution network (17). Electrical energy is distributed selectively by the management computer (21) via the management circuit (20) and to the distribution circuit (17) depending on priorities of maintaining safe flight of the rotorcraft and providing drive assistance to the engine (3) as produced by the reversible electric machine (4).

16 Claims, 2 Drawing Sheets

(56) References Cited

U.S. PATENT DOCUMENTS

| | | |
|---|---|---|
| 7,513,120 B2 | 4/2009 | Kupratis |
| 2007/0257558 A1 | 11/2007 | Berenger |
| 2008/0211237 A1 | 9/2008 | Berenger |
| 2009/0018716 A1 | 1/2009 | Ambrosio |
| 2009/0140095 A1 | 6/2009 | Sirohi et al. |
| 2009/0145998 A1 | 6/2009 | Salyer |
| 2009/0321554 A1 | 12/2009 | Roesch |
| 2010/0064689 A1 | 3/2010 | Reinhardt |
| 2010/0065677 A1 | 3/2010 | Ferrier |
| 2010/0219286 A1 | 9/2010 | Roesch |
| 2010/0224720 A1 | 9/2010 | Roesch |
| 2010/0319357 A1 | 12/2010 | Gazzino et al. |
| 2011/0121127 A1 | 5/2011 | Certain |

FOREIGN PATENT DOCUMENTS

| | | |
|---|---|---|
| EP | 2404775 A2 | 1/2012 |
| FR | 2914697 A1 | 10/2008 |
| FR | 2929324 A1 | 10/2009 |
| FR | 2961767 A1 | 12/2011 |
| FR | 2962404 A1 | 1/2012 |

HYBRID POWER SUPPLY ARCHITECTURE FOR SUPPLYING MECHANICAL POWER TO A ROTOR AND MANAGED FROM THE ON-BOARD NETWORK OF A ROTORCRAFT

CROSS REFERENCE TO RELATED APPLICATIONS

This application claims priority to French patent application No. FR 12 01974 filed on Jul. 12, 2012, the disclosure of which is incorporated in its entirety by reference herein.

BACKGROUND OF THE INVENTION (1) Field of the Invention

The present invention relates to the field of equipment for rotary wing aircraft, in particular for helicopters, and it relates to feeding energy to members that are fitted to the rotorcraft. Said members are more particularly power members such as at least one power plant for driving a rotor in rotation, and accessories and/or pieces of equipment that are useful for the working of the rotorcraft.

The present invention relates more specifically to architectures for supplying a rotor fitted to a helicopter or an analogous rotary wing aircraft with mechanical power derived from hybrid energy sources, and for managing this power supply by means of an on-board electrical network of the rotorcraft.

(2) Description of Related Art

The concept of hybrid energy sources should be considered with respect to selectively using a combustion energy source and/or an electrical energy source. The combustion energy source makes use in particular of a turboshaft engine or an internal combustion engine of the diesel engine type, and the electrical energy source makes use in particular of a reversible electric machine, and more particularly a generator/starter.

The concepts of a turboshaft engine, of an internal combustion engine, of a reversible electric machine, and of a generator/starter should not be considered narrowly, but broadly with respect to their operating mode and the ways they are implemented. More particularly, a turboshaft engine, an internal combustion engine, and a reversible electric machine, in particular a generator/starter, may be replaced by members that are commonly accepted as being analogous in terms of their operating mode and the ways they are implemented.

Helicopters are rotary wing aircraft having at least one rotor driven in rotation by at least one power plant. In the context of the present invention, consideration should be given more particularly to a hybrid power plant associating a combustion engine and an electric motor, in particular a reversible electric machine.

The rotor may be a main rotor providing the rotorcraft with its lift, and also its propulsion in a helicopter. The rotor may also be a secondary rotor such as a tail rotor serving to guide the rotorcraft about a yaw axis, or indeed a propulsive propeller in the context of a long-range high-speed rotorcraft, traditionally referred to as a hybrid helicopter.

The rotor is commonly driven in rotation by a power plant comprising at least one engine driving a main gearbox that mechanically engages the rotor. In a variety of variants associated essentially with the power of the rotorcraft and with regulations concerning the kind of territory over which the rotorcraft is allowed to fly, a rotorcraft may have a single engine or it may have more than one engine, and in particular it may be a two-engined rotorcraft. Conventionally, a single-engined rotorcraft has a turboshaft engine or an internal combustion engine, in particular a diesel engine, while a two-engined rotorcraft has two turboshaft engines. Each turboshaft engine associates a gas generator engaging a free turbine for driving rotation of the main gearbox.

The main gearbox may also be used for mechanically driving major pieces of equipment of the rotorcraft that require significant amounts of power in working, such as for example a pump or a compressor of a ventilation, heating, and/or air conditioning device. Such major pieces of equipment include a secondary power member that is mechanically driven by the main gearbox.

Furthermore, a rotorcraft is fitted with an on-board electrical network for electrically powering various pieces of equipment and/or accessories of the rotorcraft. In order to operate, those accessories require powering at a level that is considered as being moderate relative to the mechanical power that needs to be delivered for driving the rotor, and more particularly for driving the main gearbox. Such moderate power accessories of a rotorcraft are conventionally electrically powered in working from the on-board electrical network.

By way of example, the accessories may be control panel accessories and/or comfort accessories, on-board instrumentation providing information about the working and/or the environment of the rotorcraft, or indeed calculation accessories controlling the operating mode of the rotorcraft. It should be observed that these accessories include members for making the operating mode of the rotorcraft safe and/or members for providing people with safety, or indeed members that are found to be essential for enabling the pilot to guide the rotorcraft in complete safety via a man-machine interface (MMI).

The on-board network is in communication with various sources of electrical energy, such as a reversible electric machine, an electricity generator, and/or an electrical energy store. The on-board network has one or more central units controlling the distribution of energy flows to the various accessories and pieces of equipment of the rotorcraft that are to be supplied with electrical energy, or indeed to power members such as a said reversible electric machine that is capable of being used for temporarily driving the engine.

It is appropriate to ensure that the working of a rotorcraft is safe given the available electrical energy. For example, according to document FR 2 961 767 (Sagem Defense Sécurité), proposals are made to interrupt recharging electrical energy into an energy store for electrically powering an accessory of a rotorcraft in the event that an engine of the rotorcraft is in operation and said energy store is at a predefined charge threshold.

For this purpose, central units have connection interfaces (buses) in communication with various switch members, such as contactors or analogous switch members. The electrical energy resources of the rotorcraft are managed by the central units that control the flows of electrical energy passing via the on-board network.

Depending on needs, the central units control the supply of electrical power to the on-board electrical network and the distribution of this electrical power to an electricity distribution network form which auxiliary electrical networks are powered for electrically powering accessories and pieces of equipment of the rotorcraft.

The on-board electrical network is a sensitive installation of the rotorcraft and it is important to ensure that it is constantly fed with electrical energy and that it constantly has power available. It is necessary to be able to obtain a suitable electrical power supply for the various pieces of equipment and accessories of the rotorcraft regardless of the flight situations and/or the stages of flight of the rotorcraft.

Flight situations correspond in particular to a situation of starting or stopping a rotor, a situation of hovering flight, and/or a situation of low-speed flight, corresponding to the rotorcraft advancing at less than 40 knots (kt), or indeed to a situation of cruising flight in which the power plant of the aircraft is used at a nominal speed. Stages of flight correspond to a change in engine speed, such as a stage of starting or stopping the power plant, and in particular to transient stages during which the power plant is accelerated or decelerated.

Traditionally, a machine that generates electricity is incorporated in the power plant for the purpose of being driven in rotation by the engine. The electric machine delivers electricity to the on-board network and is used to feed an electrical energy store that makes it possible, where necessary, to power the on-board network.

Under such conditions, changes in technology and in requirements have led to organizing the architecture for delivering mechanical power to the rotor from a plurality of energy sources associating an engine with a reversible electric machine. Such architectures are commonly referred to as hybrid power plant architectures.

In addition to the mechanical energy contribution delivered to the rotor by the engine, the reversible electric machine is used as a drive member capable of temporarily delivering extra mechanical energy in specific flight situations and/or flight stages of the rotorcraft. By way of example, the reversible electric machine is used when starting the rotorcraft in order to initiate drive of the engine. Also by way of example, it is possible to make use of a configuration in which the reversible electric machine is engaged with the drivetrain used for driving the rotor to provide the engine with assistance during an acceleration stage, or conversely during a deceleration stage.

For example, according to document US 2009/0145998 (Ival O. Salyer), a turboshaft engine delivers the mechanical energy normally required by the rotor in a cruising flight situation. An electric motor is used for driving the rotor in predetermined flight conditions. The electric motor may be electrically powered by the on-board network from an electrical energy store, or from an electricity generator that is mechanically driven by a turboshaft engine.

Also by way of example, according to document U.S. Pat. No. 7,513,120 (United Tech. Corp.), electric machines are mechanically engaged on a turboshaft engine, one via the gas generator and the other via the free turbine. The efficiency and the performance of the gas generator are improved during transient flight stages in the operation of the engine.

Reference may also be made to document FR 2 929 324 (Turbomeca SA), in which a reversible electric machine is selectively mechanically engaged with the gas generator in order to start the engine, or with the free turbine in order to be driven in an electricity generator mode.

Document FR 2 914 697 (Turbomeca SA) proposes a hybrid power plant architecture for a rotorcraft in which electrical energy is used during transient flight stages, in particular during an acceleration or a deceleration stage.

Under such circumstances, an auxiliary electric motor is engaged with the gas generator of a turboshaft engine driving the rotor in order to assist it in an acceleration stage. The auxiliary motor is electrically powered from an electrical energy store or from a first electricity generator. The first electricity generator may be driven by the free turbine of the engine or by the mechanical drivetrain used for driving the rotor.

A second electricity generator is engaged with the gas generator in order to take mechanical energy therefrom during a deceleration stage and transform the mechanical energy it takes into electrical energy. The second electricity generator feeds electrical energy to an electrical energy store when it is driven by the gas generator. Still with respect to deceleration, the auxiliary motor may be a reversible electric machine operated to take mechanical energy from the gas generator.

A problem raised lies in reconciling delivering top-up mechanical energy from a reversible electric machine in order to drive the rotor, with safe working of the on-board network faced with the electricity needs of the rotorcraft. Account should also be taken of the possibility whereby a hybrid power plant architecture can be installed without major structural modification on board any type of rotorcraft, in particular a single-engined rotorcraft or a two-engined rotorcraft.

This difficulty is addressed in document FR 2 962 404 (Eurocopter), which discloses a hybrid power plant architecture fitted to a rotorcraft. A solution proposed in that document is in particular to draw a distinction between the on-board network operating under a nominal electric voltage and an auxiliary electrical network that is specifically reserved to the reversible electric machine operating at its own auxiliary electric voltage.

It is appropriate to optimize the use of the electric machine for delivering mechanical drive to the rotor. This seeks in particular to use a reversible electric machine to the best of its capacities, regardless of the flight situations and/or the transient flight stages of the rotorcraft.

More precisely, the reversible electric machine must be capable of being used regardless of the flight situation of the rotorcraft as considered from the stage of starting the rotor to a cruising flight situation, and vice versa, while including critical flight situations of the rotorcraft progressing at low speeds and/or hovering.

In particular, the reversible electric machine must be used during transient flight stages in which the engine needs to be assisted mechanically by the reversible electric machine in order to drive the rotor when accelerating.

More particularly in an acceleration stage, it is appropriate to deliver the top-up mechanical energy from the reversible electric machine in order to drive the rotor. Still more particularly, in a deceleration stage, it is appropriate to use the reversible electric machine and/or an electricity generator to take mechanical energy from the drivetrain for driving the rotor in rotation.

Such advantages provided by the hybrid power plant architecture need to be obtained without affecting the working of the on-board network of the rotorcraft. It is therefore also appropriate to guarantee the reliability and safe working of the on-board network. The electrical energy resources of the on-board network need to be kept available and sufficient regardless of the immediate needs of the rotorcraft, and without affecting the safety of its operation.

A quantity of electrical energy must be kept available for safe working of the various pieces of equipment and accessories in the rotorcraft. The availability of this quantity of electrical energy must not be obtained to the detriment of attempts at simplifying the hybrid power plant architecture and must take account of the electrical energy needs of numerous pieces of equipment and accessories that might be fitted to the rotorcraft. For a given mission profile of the rotorcraft, it is also important to avoid wasting energy.

Account must also be taken of it being desirable for the hybrid power plant architecture to be installed on any type of rotorcraft without requiring major structural modification, and in particular regardless of the number of engines with which the rotorcraft might be fitted and regardless of the structure of the engine used for driving the rotor, i.e. whether it is an internal combustion engine or a turboshaft engine, in particular.

Consequently, it appears not to be easy to design an architecture for delivering mechanical power to a rotorcraft rotor from hybrid energy sources while complying with all of the above-mentioned constraints.

BRIEF SUMMARY OF THE INVENTION

The object of the present invention is to provide an architecture for delivering mechanical power to a rotorcraft rotor from hybrid energy sources associating at least one combustion engine and at least one reversible electric machine, in which the organization provides a solution that is satisfactory given all of the above-mentioned constraints.

More particularly, the present invention seeks to provide such an architecture that includes ways of organizing and operating the on-board electrical network of the rotorcraft that enable a hybrid power plant of a high-performance rotorcraft to be operated in satisfactory manner without affecting safe working of the on-board network, given the operating requirements and safe flight conditions that apply to rotorcraft.

The present invention also more particularly seeks to provide such an architecture that is simple in structure and that avoids excessively loading the rotorcraft, enabling the architecture to be installed without major structural modification on any type of rotorcraft.

The architecture of the present invention is an architecture for delivering mechanical power to a rotorcraft rotor from hybrid energy sources. Such an architecture associates at least one combustion engine fitted with means for regulating its operating mode and at least one reversible electric machine fitted with means for regulating its operating mode.

More precisely, said architecture comprises a drivetrain for driving the rotor from at least one power plant comprising a said engine engaged with a said reversible electric machine. The drivetrain comprises a main gearbox engaged with the rotor and engaged with the engine to be driven thereby. The main gearbox is engaged with the rotor in order to drive it, in particular via mechanical transmission means.

At least one electrical energy store, optionally fitted with means for controlling its operating mode, is supplied with electrical energy from the reversible electric machine and from at least one electricity generator fitted with means for regulating its operating mode. The electricity generator is driven in rotation from the drivetrain, and preferably from the main gearbox without excluding the possibility of engaging the electrical generator at any point in the drivetrain for driving the rotor from the main gearbox.

An on-board electricity network of the rotorcraft collects and distributes electrical energy from electrical energy sources comprising at least a said reversible electric machine, at least a said electricity generator, and at least a said electrical energy store. The on-board network comprises an electricity distribution network dedicated to supplying equipment of the rotorcraft with electrical energy, which equipment is optionally provided with means for regulating its operating mode.

A man-machine interface (MMI) is associated with the command calculation means. A pilot acts on the members of the rotorcraft via the man-machine interface in order to modify the working of said members of the rotorcraft, which members include at least the power plant and said equipment to be supplied with electrical energy.

According to the present invention, the on-board network comprises a management network distinct from the electricity distribution network and interposed between the electrical energy sources and the electricity distribution network. It should be considered that the on-board network comprises an electrical distribution architecture including the management network, a management computer, and said electrical energy sources fitted to the rotorcraft, and in particular at least one reversible electric machine, at least one electricity generator, and at least one energy store. Operation of the management network depends on said management computer which is in communication with communication interfaces for issuing management information. On the basis of the management information, the management computer operates the management network to distribute the electricity from the electrical energy sources selectively via the management network to the distribution network from the management network.

More particularly, the management network is operated by the management computer controlling the respective electrical power supplies firstly via the management network and from the management network to the electricity distribution network. The management computer also controls the respective supplies of electrical energy to the electrical energy sources during a stage of supplying electrical energy, comprising at least one said reversible electric machine and at least one said electrical energy store.

The management computer performs said regulation of the electrical power supplies on the basis of management information converging on the management computer. Said management information relates in particular to the working of the engine, to the operating mode of the electrical energy sources, and to the electrical energy needs of the electricity distribution network.

In particular, the management information is delivered to the management computer via communication interfaces, respectively an external communication interface and an internal communication interface, preferably as follows:

the management computer is in communication via the external communication interface at least with the man-machine interface MMI, with the means for regulating the engine, which means generate command information, and with means for evaluating the electrical energy needs of the equipment. Said electrical energy need evaluation means generate restriction information relating to the electrical energy needs of the equipment supplied with electrical energy from the distribution network. Such means for evaluating needs may comprise said regulation means with which the equipment is potentially fitted, and/or, for example, means for measuring the electric voltage of the distribution network that is indicative of said needs that are to be evaluated, or other analogous means suitable for evaluating the electrical energy needs of the distribution network in order to deliver electrical power to the equipment; and the management computer is in communication via the internal communication interface at least with the means for regulating the electricity generator, with at least the means for regulating the reversible electric machine and possibly also with the means for regulating the operating mode of the electrical energy store with which it is optionally fitted. The electrical energy sources generate availability information about the availability of the electrical energy resource to respond to the potential needs of the rotorcraft in electrical energy.

Starting from command information relating to the flight situation and to the stages of flight of the rotorcraft, starting from restriction information relating in particular to the electrical energy needs of the distribution network for supplying electrical energy to the equipment, and starting from availability information about the electrical energy resource, the management computer is advantageously governed by the following modes of regulation:

in a situation of starting the rotor, the management computer generates command orders on a priority basis for driving the engine by the reversible electric machine, which machine is supplied with electrical energy from the electrical energy store. The management network is powered from the electrical energy store, if necessary supported by or indeed substituted by an electrical power supply from the ground and external to the rotorcraft.

in a situation of cruising flight, and depending on the availability information and on the restriction information, the management computer generates command orders for feeding electrical energy on a priority basis to the distribution network and on a subsidiary basis to the electrical energy store. Such a supply of electrical energy is advantageously delivered from the reversible electrical machine and from the electricity generator which are driven by the engine. The electrical energy store is then advantageously used to filter the electrical energy flowing in the on-board network.

in a stage of acceleration of the engine, and depending on the availability information and on the restriction information, the management computer generates command orders for delivering mechanical assistance in driving the rotor being driven by the engine. Such assistance is obtained from the reversible electric machine, unless it has been made unavailable on a priority basis because of the need to supply electrical energy to the distribution network. The reversible machine and the distribution network supplied with electrical energy from the management network are supplied with electrical energy on a priority basis by the electricity generator if not also by the electrical energy store.

in a stage of deceleration of the engine, and depending on needs as defined by the command information, the management computer generates command orders for causing mechanical energy to be extracted from the engine by the reversible electric machine and from the drive train by the electricity generator from the drivetrain. Depending on the availability information and on the restriction information the management computer selectively generates command orders for supplying electrical energy on a priority basis to the electricity distribution network if not also to the electrical energy store, from the reversible electric machine and from the electricity generator.

It can be understood that having the management computer dependent on the availability information and the restriction information relates to pre-established procedures for supplying energy that are considered as having priority or as being subsidiary depending on the available electrical energy resources and on the identified individual needs for electrical energy of the pieces of equipment of the rotorcraft. The electrical energy resources that are considered as being available may take account of an emergency quantity of electrical energy that needs to be maintained. Such an emergency quantity of electrical energy is stored in particular in the electrical energy store or by analogy in a subsidiary electrical energy store that is specifically dedicated to ensuring that said emergency quantity of electrical energy is kept available.

When the rotorcraft is a two-engined rotorcraft, the architecture has a pair of said power plants for driving a common main gearbox. The management computer is in communication with a said external communication interface and with at least one internal communication interface in communication with said electrical energy sources individually associated with the power plants.

The internal communication interface may be a single interface for all of the electrical energy sources respectively associated with each of the power plants. For convenience in installing the distribution architecture combining two management assemblies associated respectively with each of the power plants of a two-engined rotorcraft, two of said internal communication interfaces in communication with the management computer are associated respectively with said electrical energy sources included individually in the respective management assemblies and the like making up the management network.

More particularly, the management network advantageously comprises a pair of management assemblies allocated to respective ones of the power plants. The management assemblies are interposed between the electricity distribution network and respective ones of said electrical energy sources allocated to the management assemblies. The management network has an interface circuit between the management assemblies, said interface circuit being provided with an interface switch that is actuated under the control of the management computer.

By using a command for activating the interface switch, the management computer acts advantageously and selectively to control the supply of electrical energy from any one of said electrical energy sources respectively allocated to each of the management assemblies via each of the management assemblies and to the distribution circuit selectively in isolation or in combination from one and/or the other of the management assemblies. The management computer also acts selectively to control the supply of electrical energy to the respective electrical energy sources during a stage of supplying them with electrical energy, each of which sources is allocated to one or the other of the management assemblies.

From such an organization of the distribution architecture, with a first engine of one of the power plants started, a situation of starting a second engine of the other power plant is initiated using the reversible electric machine that is fitted to the second engine. The reversible electric machine is supplied with electrical energy selectively on a priority basis from at least one of the electrical energy sources allocated to a first management assembly associated with the first engine if not also, depending on availability information about the electrical energy sources allocated to the first management assembly and depending on the restriction information, from the electrical energy store of a second management assembly associated with the second engine.

When the engine is a turboshaft engine associating a gas generator and a free turbine engaged with the main gearbox, the reversible electric machine is preferably engaged with the gas generator, and the electricity generator is preferably engaged with the main gearbox.

In a possible embodiment of the same management assembly, at least a first electricity generator is engaged with the main gearbox and at least a second electricity generator is engaged with a mechanical power source comprising, equally well, said transmission means and equipment driven in rotation by the main gearbox. As mentioned above, the second electricity generator may be drivingly engaged on any moving member of said drivetrain.

The electrical energy store may also advantageously be in communication with at least one independent electrical energy source that is operated under the control of the management computer. By way of example, said independent energy source comprises equally well an inertial energy source, a fuel cell, an energy recovery device, a thermodynamic engine, and/or a solar energy capture device.

In a preferred embodiment, the management computer is in communication with means for measuring the electric voltage, the electric current, and the temperature of the management network, and with means for displaying the corresponding measured information. Such information is advantageously made available to the pilot of the rotorcraft by display means.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

Figure 1:
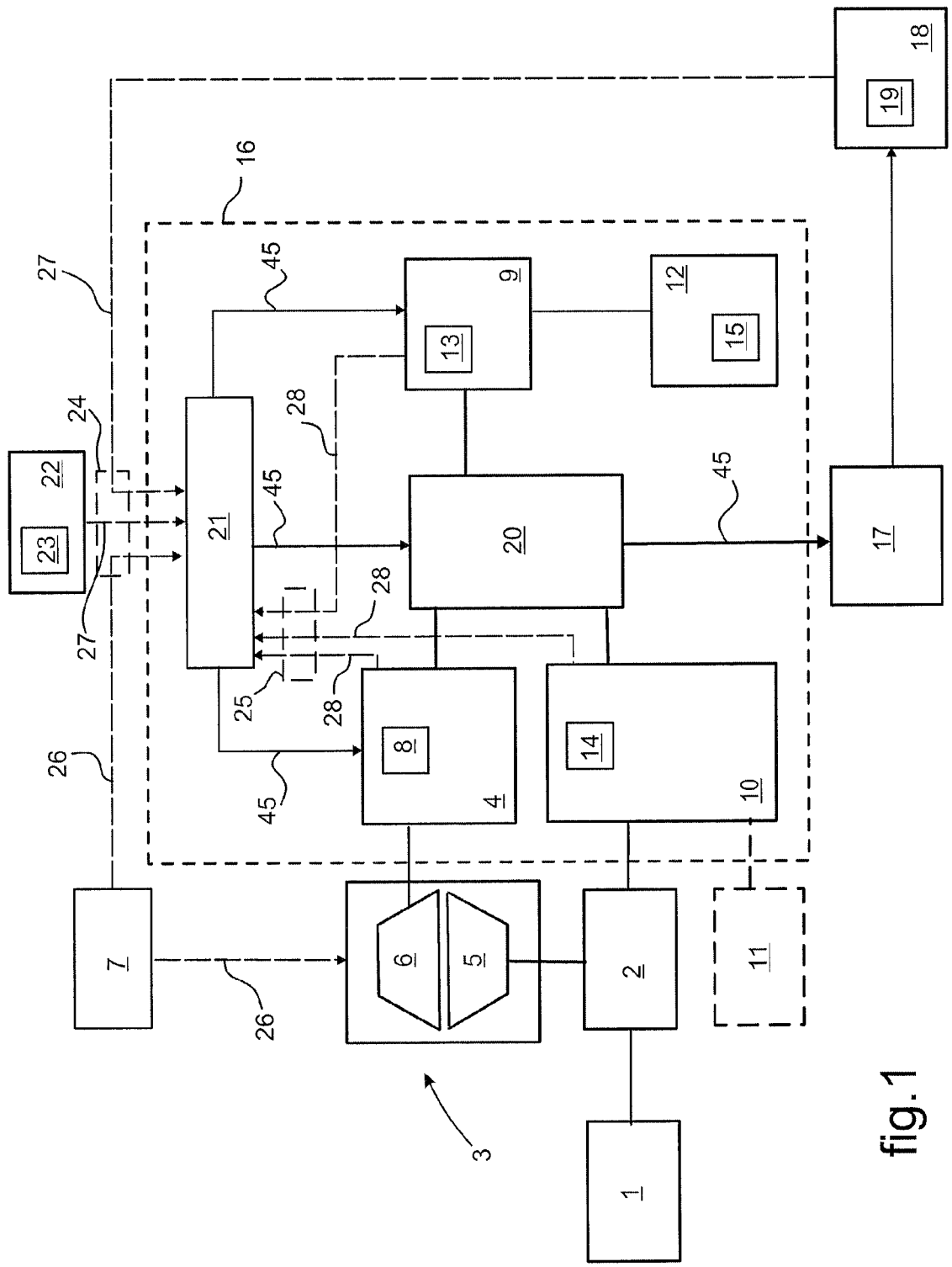
FIG. 1 is a diagram showing a mechanical power supply architecture using hybrid energy sources for at least one single-engined rotorcraft rotor, in an embodiment of the present invention.

In FIG. 1, a rotorcraft rotor 1 is driven in rotation from a main gearbox (MGB) 2 that is itself driven by two mechanical drive sources 3 and 4. A first drive source is constituted by a combustion engine 3, and more particularly by a turboshaft engine including a gas generator 6 for driving a free turbine 5 in rotation, which free turbine is mechanically engaged with the MGB 2. The second drive source is constituted by a reversible electrical machine 4 engaged with the engine 3, and more particularly with its gas generator 6. The engine 3 and the reversible electric machine 4 are fitted with respective means 7 and 8 for regulating their operating mode.

A store of electrical energy 9 is potentially supplied with electrical energy by the reversible electric machine 4 and by an electricity generator 10 that is driven from the MGB 2, or from any other mechanical power source 11 of the rotorcraft. The electrical energy store 9 is also potentially supplied with energy from an independent electrical energy source 12. The electrical energy store 9 and the electricity generator 10, and also preferably the independent electrical energy source 12, are fitted with respective means 13, 14, and 15 for regulating their operating mode.

The rotorcraft is fitted with a man-machine interface 22 associated with command calculation means 23 for enabling the pilot to act on the MMI 22 so as to act on the various members of the rotorcraft in order to modify their working.

The rotorcraft is also fitted with an on-board network comprising a distribution architecture 16 for distributing electrical energy to an electricity distribution network 17, with equipment 18 of the aircraft being supplied with electrical energy from said electricity distribution network 17. Such equipment 18 is potentially provided with means for regulating its operating mode.

The distribution architecture 16 has various electrical energy sources, in particular the reversible electric machine 4, the electricity generator 10, and the electrical energy store 9. The distribution architecture 16 also has a management network 20 used by a management computer 21. The management network 20 is interposed between the various electrical energy sources 4, 9, 10 and the electricity distribution network 17 in order to supply it with electricity depending on the individual requirements of pieces of the equipment 18.

The management computer 21 controls the supply of electrical energy by using the management network 20 to communicate with the electricity distribution network 17 from the management network 20, and it does so as a function of the available electrical energy resources and as a function of the energy needs of the rotorcraft. For this purpose, the management computer 21 takes account in particular of safe progress in flight of the rotorcraft, maintaining an optimized electrical energy resource, and mechanical assistance occasionally delivered to the engine 3 by the reversible electric machine 4 for the purpose of driving the rotor 1, depending on the stages of flight of the rotorcraft and the operating conditions of the engine 3.

More particularly, the regulation provided by the management computer 21 is made to depend on various items of management information 26, 27, 28 that are transmitted to the management computer 21. This management information 26, 27, 28 relates in particular to the working of the engine 3, to the working of the electrical energy sources 4, 9, 10, and to the electrical energy needs of the electricity distribution network 17. Consideration is given to communication interfaces between the management computer 21 and various members of the rotorcraft, which interfaces are organized as an external communication interface 24 and an internal communication interface 25.

The external communication interface 24 comprises means for putting the management computer 21 into communication with various members of the rotorcraft that make requests for electrical energy from the electricity distribution network 17. Such energy requests are issued in particular by the pieces of equipment 18 and/or by the MMI 22. The external communication interface 24 also comprises means for putting the management computer 21 into communication with the means 7 for regulating the working of the engine 3. The internal communication interface 25 comprises means for putting the management computer 21 into communication with the various electrical energy sources included in the distribution architecture 16, and in particular the reversible electrical machine 4, the electrical energy generator 10, and the electrical energy store 9.

The management computer 21 more specifically receives:

command information 26 delivered by the means 7 for regulating the working of the engine 3. The command information 26 comprises information relating in particular to the state of flight of the rotorcraft and to the mechanical energy needs of the engine 3;

restriction information 27 delivered by means 19 for evaluating the electrical energy needs of the equipment 18 from the distribution network 17 and/or delivered by the command calculation means 23 associated with the MMI 22;

availability information 28 relating to the electrical energy resource and delivered by the electrical energy sources 4, 9, and 10.

From the management information 26, 27, 28, the management computer issues command orders 45 controlling the supply of electrical energy to the distribution network 17 and the management network 20 as a function of flight situations of the rotorcraft and of operating situations of the engine 3, such as a rotor-starting situation, a cruising flight situation of the rotorcraft, and a stage in which the engine 3 is accelerating and/or decelerating.

In conventional working of the engine 3, i.e. in the absence of assistance from the reversible electric machine 4, the distribution architecture 16 serves to take mechanical energy from the gas generator 6 of the engine 3 or indeed from various transmission means included in the drivetrain for driving the rotor 1 from the engine 3. The electrical energy that is taken is used to deliver electrical energy to the distribution network 17, or to optimize the storage and immediate availability of the electrical energy that is produced.

The electrical energy store 9 can be used to filter the electrical energy flowing in the on-board electricity network of the rotorcraft, or indeed to provide a permanent store having a predetermined quantity of emergency electrical energy for use in the event of a reduction in or a loss of the energy normally delivered by the electrical energy producing sources, and more specifically the reversible electric machine 4 and the electrical energy generator 10. The engine(s) 3 may be started on the ground or in flight in complete safety, taking into account priority or even essential needs of the distribution network 17. Transfers of electrical power may be performed in complete safety between the various electrical members that are supplied with electrical energy by the on-board network of the rotorcraft.

In the mode in which the engine 3 is being assisted by the reversible electric machine 4, such assistance is provided by mechanical energy being delivered to the engine 3 from the reversible electric machine 4, on condition that safe flight of the rotorcraft is maintained by selectively supplying the distribution network 17 with electrical energy depending on the priority or secondary needs of the pieces of equipment 18. The assistance delivered by the reversible electric machine 4 is determined by the means for regulating the working of the engine 3 as a function of the available electrical energy and of any energy needs that are to be delivered to the distribution network 17.

The distribution architecture 16 provides transient mechanical assistance to the engine 3, such as during a takeoff stage or an acceleration stage, and over its entire range of operating speeds. Such assistance is obtained by obtaining a supply of electrical energy from the distribution network 17 depending on needs and complying with the conditions for safe flight of the rotorcraft. Such assistance may also be provided to one or more engines fitted to the rotorcraft, regardless of whether or not this plurality of engines 3 are associated with each other.

Figure 2:
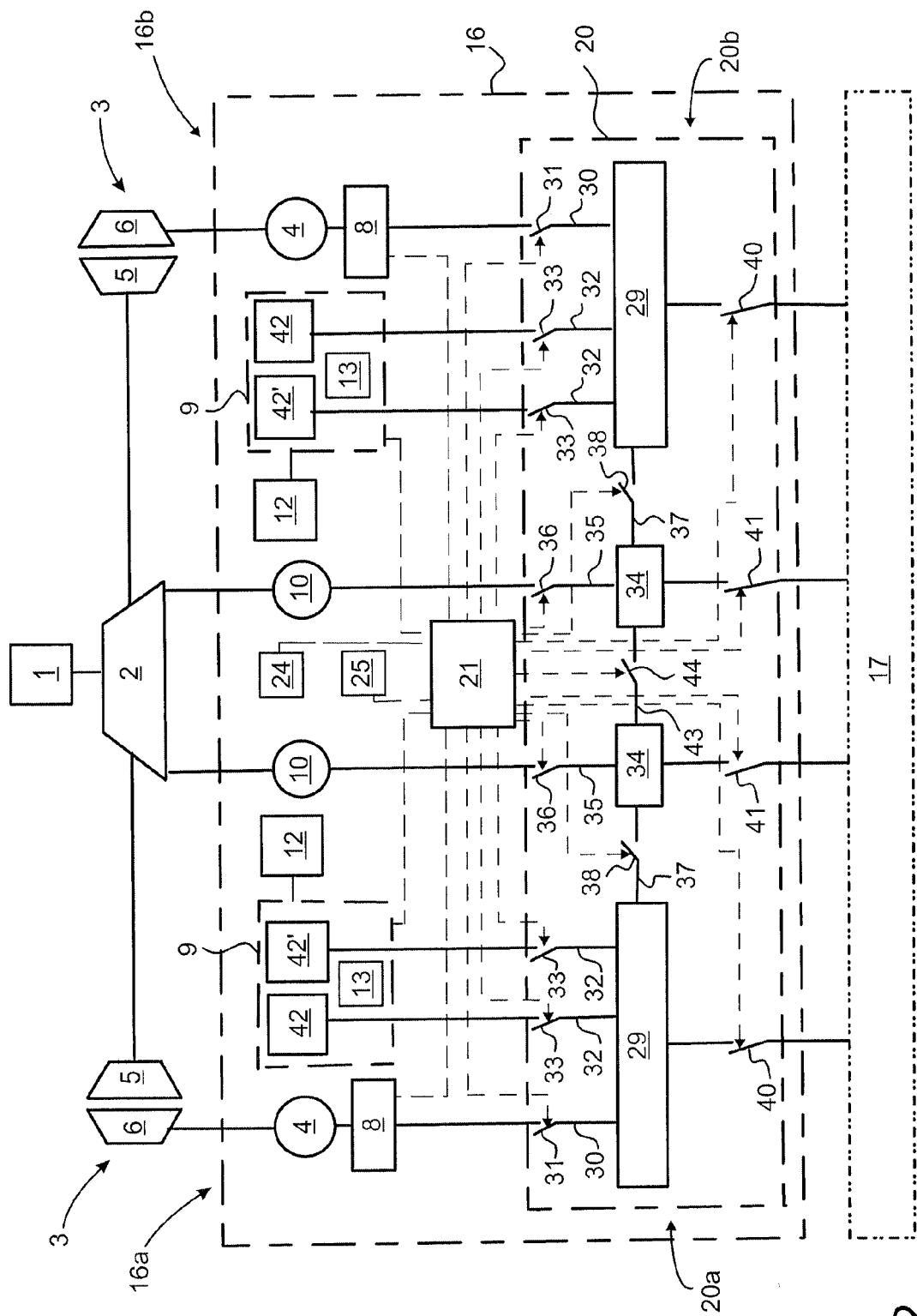
FIG. 2 is a diagram showing an embodiment in accordance with the present invention of an electrical energy distribution architecture of an on-board electricity network of a two-engined rotorcraft.

For example, in FIG. 2, a said architecture 16 for distributing electrical energy is installed on board a two-engined rotorcraft. This figure shows two individual architectures for delivering mechanical power by means of hybrid energy sources to at least one rotor of the two-engined rotorcraft, of the kind shown in isolation in FIG. 1 for a single-engined rotorcraft.

In conventional manner, the MGB 2 is engaged with each of the engines 3 carried by the rotorcraft for driving the rotor 1.

Each engine 3 comprises a turbine engine associating a gas generator 6 with a free turbine 5. For each engine 3, a reversible electric machine 4 is engaged with the gas generator 6 and an electricity generator 10 is engaged with the MGB 2, or analogously with any other powered mechanical member included in the drivetrain for driving the rotor 1 from one and/or the other of the engines 3. In the embodiment shown, the electricity generators 10 are two in number and they are allocated to respective ones of the individual architectures. In one possible embodiment, the electricity generators 10 respectively allocated to each of the individual architectures are constituted by a single electricity generator 10 in common. Such a common electricity generator 10 is engaged with the mechanical drivetrain for driving the rotor 1, and in particular with the MGB 2.

The electrical energy distribution architecture 16 has a said management computer 21 in communication with said communication interfaces, respectively an external communication interface 24 and an internal communication interface 25. A said management network 20 is interposed between the electrical energy sources 4, 9, and 10 of the distribution architecture 16 and the distribution network 17. The distribution architecture 16 is segregated as two analogous individual distribution architectures 16a and 16b for distributing electrical power in association with the management computer 21, which is common to both of the individual distribution architectures 16a and 16b. The management network 20 is segregated as two management assemblies 20a and 20b, each having a respective one of the individual distribution architectures 16a and 16b.

The on-board network, whether of a single-engined rotorcraft or of a two-engined rotorcraft, may be fitted without major structural modification with one or more individual distribution architectures 16a and/or 16b depending on the number of engines 3 fitted to the rotorcraft. As specified below, management assemblies 20a and 20b associated with respective engines 3 can easily be put into communication with one another via an interface circuit 43 interposed between the management assemblies 20a and 20b.

It should be understood that in a general approach of the invention, the management network 20 has at least one said management assembly 20a or 20b. With a single-engined rotorcraft, the management network 20 only has only one management assembly 20a or 20b. With a two-engined rotorcraft, the management network 20 is segregated into two management assemblies 20a and 20b that are respectively associated with each of the power plants of such a two-engined rotorcraft, with said management assemblies advantageously being put into communication with each other via a said interface circuit 43 and being under the control of a single management computer 21.

Each of said individual distribution architectures 16a and 16b has said electrical energy sources including a said reversible electric machine 4, a said electricity generator 10, and a said electrical energy store 9. It should be understood that each of the electrical energy sources 4, 9, 10 has respective means 8, 14, and 13 for regulating its operating mode.

In the embodiment shown of the present invention, the management network 20 and more particularly each of its management assemblies 20a and 20b comprises:

at least one first connection interface 29 of the management network 20 with the first electrical power supply circuit 30 from the reversible electric machine 4 having a first electrical power supply switch 31, and with a second electrical power supply circuit 32 from the electrical energy store 9 having a second electrical power supply switch 33;

at least one second connection interface 34 of the management network 20 with a third electrical power supply circuit from the electricity generator 10 having a third electrical power supply switch 36;

at least one selective distribution circuit 37 for electrically powering the management network 20 interposed between the first connection interface 29 and the second connection interface 34, and having an electrical power supply transfer switch 38;

at least one first electrical distribution switch 40 interposed between a said first connection interface 29 and the electricity distribution network 17; and at least one second electrical distribution switch 41 interposed between a said second connection interface 34 and the electricity distribution network 17.

The management computer 21 is a control regulator for selectively actuating the first electrical power supply switch 31, the second electrical power supply 33, the third electrical power supply switch 35, the electrical power supply transfer switch 38, the first electrical distribution switch 40, and the second electrical distribution switch 41.

The electrical energy store 9 may comprise at least two distinct individual electrical energy stores 42, 42', comprising respectively at least one battery 42 and at least one supercapacitor 42'.

Under such circumstances, the second electrical power supply circuit 32 is preferably subdivided into at least two individual second electrical power circuits 32 of the management network 20. Such electrical powering of the management network 20 from said two second individual circuits 32 is controlled by the management computer 21 respectively and selectively from one and/or the other of the individual electrical energy stores 42 and 42'. The individual electrical power supply circuits 32 are in particular provided with at least two respective second individual electrical power supply switches 33 for which the individual actuations are controlled selectively by the management computer 21.

Advantageously, the management network 20 comprises an interface circuit 43 between the management assemblies 20a and 20b, said interface circuit 43 being provided with an interface switch 44. Actuation of the interface switch 44 is controlled from the management computer 21, selectively with the switches in each of said management assemblies 20a and 20b. The actuation of the interface switch 44 is performed by the management computer 21 depending on said restriction information and on said availability information as delivered by the electrical energy sources 4, 9, 10 respectively allocated to each of the management assemblies 20a and 20b.

In the embodiment shown of the architecture for feeding mechanical power from hybrid energy to the rotor as applied to a two-engined rotorcraft, the management computer 21 is more particularly governed in application of the following regulation modes:

in a situation of starting a first engine 3, the reversible electric machine 4 with which it is fitted drives the first engine 3. The reversible electric machine 4 is then supplied with electrical energy on being supplied with electrical energy on a priority basis by the electrical energy store 9 of the corresponding management assembly 20a, 20b, if not also by the electrical energy store 9 associated with the other management assembly 20a, 20b.

once the first engine 3 has started and in a situation of starting the second engine 3, the reversible electric machine 4 with which it is fitted drives the second engine 3. The reversible electric machine 4 of the second engine 3 is supplied with electrical energy selectively on a priority basis from the electrical energy sources 4, 9, 10 allocated to a first management assembly 20a associated with the first engine 3 if not also, depending both on the availability information about the electrical energy sources 4, 9, 10 associated with the first management assembly 20a and also on the restriction information, from the electrical energy store 9 of a second management assembly 20b associated with the second engine 3.

Then, once both the first and the second engines 3 have started:

in a situation of cruising flight, the management network 20 and the electrical energy stores 9, 4, 10 respectively allocated to each of the management assemblies 20a and 20b are supplied with electrical energy from the reversible electric machines 4 and from the electricity generators 10. The electrical energy stores 9 of each of the management assemblies 20a and 20b are used for filtering the electrical energy flowing in the on-board network.

in a stage of accelerating the engines 3, the rotor 1 is driven jointly by the engines 3 and by the reversible electric machines 4 respectively allocated to each of the management assemblies 20a and 20b. The on-board network and the reversible electric machines 4 are selectively supplied with electrical energy from the electrical energy stores 9 and from the electricity generators 10 respectively allocated to the management assemblies 20a and 20b depending on the availability information relative to each of the management assemblies 20a and 20b.

in a stage of decelerating the engines 3, mechanical energy is taken selectively by the reversible electric machines 4 and by the electricity generators 10 of each of the management assemblies 20a and 20b. The electricity distribution network 17 if not also the electrical energy stores 9 are supplied with electrical energy selectively and on a priority basis from the reversible electric machines 4 and the electricity generators 10 respectively allocated to the management assemblies 20a and 20b.

What is claimed is:

1. An architecture for supplying mechanical power to a rotorcraft rotor from hybrid energy, the architecture associating at least one combustion engine fitted with an operating mode regulator and at least one reversible electric machine fitted with an operating mode regulator, said architecture comprising:

a drivetrain for driving the rotor from at least one power plant comprising the engine engaged with the reversible electric machine, the drivetrain comprising a main gearbox engaged with the rotor and engaged with the engine to be driven thereby;

at least one electrical energy store supplied with electrical energy from the reversible electric machine and from at least one electricity generator fitted with an operating mode regulator, the electricity generator being driven in rotation from the drivetrain;

an on-board electricity network of the rotorcraft collecting and distributing electrical energy from electrical energy sources comprising at least the reversible electric machine, at least the electricity generator, and at least the electrical energy store, the on-board network comprising an electricity distribution network dedicated to supplying equipment of the rotorcraft with electrical energy; and a man-machine interface associated with a command calculator via which man-machine interface a pilot can act on a plurality of members of the rotorcraft to modify their working, the members of the rotorcraft comprising at least one power plant and the equipment to be supplied with electrical energy;

wherein the on-board network comprises an electrical distribution architecture including the electrical energy sources, a management network, and a management computer, the management network being distinct from the electricity distribution network by being interposed between the electrical energy sources and the electricity distribution network, operating mode of the management network being dependent on the management computer in communication with communication interfaces for issuing management information, on the basis of management information the management computer operates the management network by selectively distributing the electrical energy delivered by the electrical energy sources via the management network and to the distribution network from the management network.

2. The architecture of claim 1, wherein the management network is operated by the management computer controlling the respective electrical energy sources firstly via the management network and from the management network to the electricity distribution network, and secondly from the electrical energy sources comprising at least the reversible electric machine and at least the electrical energy store during a stage of supplying electrical energy, the management computer performing the regulation of the electrical energy sources on the basis of management information converging on the management computer, the management information relating to the working of the engine, to the working of the electrical energy sources and to the electrical energy needs of the electricity distribution network.

3. The architecture of claim 1, wherein the management information is delivered to the management computer via communication interfaces, respectively an external communication interface and an internal communication interface, as follows:

the management computer is in communication via the external communication interface at least with the man-machine interface, with the operating mode regulator of the engine, which generates command information, and with an electrical energy evaluator of the equipment, the electrical energy evaluator of the equipment generating restriction information relating to electrical energy needs of the equipment; and the management computer is in communication via the internal communication interface with the operating mode regulator of the electricity generator, the operating mode regulator of the reversible electric machine, and an operating mode regulator of the electrical energy store, the electrical energy sources generating availability information about the availability of the electrical energy resource.

4. The architecture of claim 1, wherein starting from command information relating to the flight situation and to the stages of flight of the rotorcraft, starting from restriction information relating to the electrical 1 energy needs of the electricity distribution network, and starting from availability information about the electrical energy resource, the management computer is governed by the following modes of regulation:

in a situation of starting the rotor, the management computer generates command orders on a priority basis for driving the engine by the reversible electric machine powered by electrical energy from the electrical energy store, the management network being powered exclusively from the electrical energy store if necessary supported by an electrical power supply external to the rotorcraft;

in a situation of cruising flight, and depending on the availability information and on the restriction information, the management computer generates command orders for feeding 1 electrical energy on a priority basis to the electricity distribution network and on a subsidiary basis to the electrical energy store from the reversible electrical machine and from the electricity generator, the electrical energy store being used to filter the electrical energy flowing in the on-board network;

in a stage of acceleration of the engine and depending on the availability information and on the restriction information, the management computer generates command orders for causing mechanical assistance in driving the rotor being driven by the engine to be delivered from the reversible electric machine unless it has been made unavailable on a priority basis because of the need to supply electrical energy to the electricity distribution network, the electricity distribution network and the reversible electric machine being supplied with electrical energy on a priority basis by the electricity generator if not also by the electrical energy store; and in a stage of deceleration of the engine, depending on needs as defined by the command information, the management computer generates command orders for causing mechanical energy to be extracted from the engine by the reversible electric machine and from the drivetrain by the electricity generator, and depending on the availability information and on the restriction information, it selectively generates command orders for supplying electrical energy from the reversible electric machine and from the electricity generator on a priority basis to the electricity distribution network if not also to the electrical energy store.

5. The architecture of claim 1, wherein the management network comprises at least one management assembly comprising:

at least one first connection interface of the management network with a first electrical power supply circuit from the reversible electric machine having a first electrical power supply switch, and with a second electrical power supply circuit from the electrical energy store having a second electrical power supply switch;

at least one second connection interface of the management network with a third electrical power supply circuit from the electricity generator having a third electrical power supply switch;

at least one selective distribution circuit for electrically powering the management network interposed between the first connection interface and the second connection interface, and having an electrical power supply transfer switch;

at least one first electrical distribution switch interposed between the first connection interface and the electricity distribution network; and at least one second electrical distribution switch interposed between the second connection interface and the electricity distribution network;

and wherein the management computer is a control regulator for selectively actuating the first electrical power supply switch, the second electrical power supply, the third electrical power supply switch, the electrical power supply transfer switch, the first electrical distribution switch, and the second electrical distribution switch.

6. The architecture of claim 1, wherein the electrical energy store comprises at least two distinct individual electrical energy stores, comprising respectively at least one battery and at least one supercapacitor.

7. The architecture of claim 6, wherein the second electrical power supply circuit is subdivided into at least two individual second electrical power circuits of the management network respectively and selectively from one and the other of the individual electrical energy stores, the individual electrical power supply circuits being provided with at least two respective second individual electrical power supply switches for which the individual actuations are controlled selectively by the management computer.

8. The architecture of claim 1, wherein the rotorcraft is a two-engined rotorcraft and the architecture has a pair of the power plants for driving a common main gearbox, the management computer is in communication with an external communication interface and with an internal communication interface in communication with the electrical energy sources individually associated with the power plants.

9. The architecture of claim 8, wherein the management network comprises a pair of management assemblies allocated to respective ones of the power plants, the management assemblies being interposed between the electricity distribution network and respective ones of the electrical energy sources allocated to the management assemblies, the management network having an interface circuit between the management assemblies provided with an interface switch that is actuated under the control of the management computer; and wherein, by controlling activation of the interface switch, selectively from any one of the electrical energy sources respectively allocated to each of the management assemblies, the management computer acts to control firstly the supply of electrical energy via each of the management assemblies and to the electricity distribution network, and secondly the supply of electrical energy to the electrical energy sources while they are being supplied with electrical energy, each of which sources is allocated to one or the other of the management assemblies.

10. The architecture of claim 9, wherein in a situation of starting a second engine, after a first engine has already started, the reversible electric machine fitted to the second engine is supplied with electrical energy selectively on a priority basis from at least one of the electrical energy sources allocated to a first management assembly associated with the first engine and, depending on availability information about the electrical energy sources allocated to the first management assembly and depending on the restriction information, from the electrical energy store of a second management assembly associated with the second engine.

11. The architecture of claim 8, wherein the management network comprises a pair of management assemblies allocated to respective ones of the power plants, the management assemblies being interposed between the electricity distribution network and respective ones of the electrical energy sources allocated to the management assemblies, the management network having an interface circuit between the management assemblies provided with an interface switch that is actuated under the control of the management computer; wherein, by controlling activation of the interface switch, selectively from any one of the electrical energy sources respectively allocated to each of the management assemblies, the management computer acts to control firstly the supply of electrical energy via each of the management assemblies and to the electricity distribution network, and secondly the supply of electrical energy to the electrical energy sources while they are being supplied with electrical energy, each of which sources is allocated to one or the other of the management assemblies, and wherein the interface switch is actuated under the control of the management computer selectively with the switches included in each of the management assemblies depending on the restriction information and on the availability information delivered by the electrical energy sources respectively associated with each of the management assemblies.

12. The architecture of claim 11, wherein the management computer is governed according to the following control modes:

in a situation of starting a first engine, the reversible electric machine with which it is fitted drives the first engine on being supplied with electrical energy on a priority basis by the electrical energy store of the corresponding management assembly, if not also by the electrical energy store associated with the other management assembly, and then once the first engine has started;

in a situation of starting the second engine, the reversible electric machine with which it is fitted drives the second engine, being supplied with electrical energy selectively on a priority basis from the electrical energy sources allocated to a first management assembly associated with the first engine if not also, depending both on the availability information about the electrical energy sources associated with the first management assembly and on the restriction information, from the electrical energy stores of a second management assembly associated with the second engine, and then once both the first and the second engines have started;

in a situation of cruising flight, the management network and the electrical energy stores respectively allocated to each of the management assemblies are supplied with electrical energy from the reversible electric machines and from the electricity generators, the electrical energy stores of each of the management assemblies being used for filtering the electrical energy flowing in the on-board network;

in a stage of accelerating the engines, the rotor is driven jointly by the engines and by the reversible electric machines respectively allocated to each of the management assemblies, the on-board network and the reversible electric machines being selectively supplied with electrical energy from the electrical energy stores and from the electricity generators respectively allocated to the management assemblies depending on the availability information relative to each of the management assemblies; and in a stage of decelerating the engines, mechanical energy is taken selectively by the reversible electric machines and by the electricity generators of each of the management assemblies, and on a priority basis the electricity distribution network if not also the electrical energy stores are supplied with electrical energy selectively from the reversible electric machines and the electricity generators respectively allocated to the management assemblies.

13. The architecture of claim 1, wherein the engine is a turboshaft engine associating a gas generator and a free turbine engaged with the main gearbox, the reversible electric machine is engaged with the gas generator, and the electricity generator is engaged with the main gearbox to be driven respectively in rotation thereby.

14. The architecture of claim 1, wherein at least a first electricity generator is engaged with the main gearbox and wherein at least a second electricity generator is engaged with a mechanical power source.

15. The architecture of claim 1, wherein the electrical energy store is in communication with at least one independent electrical energy source that is operated under the control of the management computer, the independent energy source comprising at least one of an inertial energy source, a fuel cell, an energy recovery device, a thermodynamic engine, and a solar energy capture device.

16. The architecture of claim 1, wherein the management computer is configured to measure electric voltages, electric currents, and temperatures of the management network, and to display the corresponding measured information.

* * * * *